(12) United States Patent
Chen et al.

(10) Patent No.: US 10,886,518 B2
(45) Date of Patent: Jan. 5, 2021

(54) SEPARATOR ASSEMBLY AND BATTERY MODULE

(71) Applicant: Contemporary Amperex Technology Co., Limited, Ningde (CN)

(72) Inventors: Sien Chen, Ningde (CN); Xin Zeng, Ningde (CN); Shoujiang Xu, Ningde (CN); Chunyan Feng, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 155 days.

(21) Appl. No.: 16/249,061

(22) Filed: Jan. 16, 2019

(65) Prior Publication Data

US 2019/0393468 A1 Dec. 26, 2019

(30) Foreign Application Priority Data

Jun. 22, 2018 (CN) .......................... 2018 2 0969359

(51) Int. Cl.
*H01M 2/10* (2006.01)
*H01M 2/20* (2006.01)
*H01M 2/18* (2006.01)

(52) U.S. Cl.
CPC .......... *H01M 2/18* (2013.01); *H01M 2/1077* (2013.01); *H01M 2/206* (2013.01); *Y02E 60/10* (2013.01)

(58) Field of Classification Search
CPC .................................................. H01M 2/206
See application file for complete search history.

(56) References Cited

U.S. PATENT DOCUMENTS

2018/0123191 A1    5/2018    Dudley et al.

FOREIGN PATENT DOCUMENTS

| CN | 109273650 A  | 1/2019 |
| EP | 2590243 A2   | 5/2013 |
| EP | 3264493 A1   | 1/2018 |
| EP | 3336928 A1   | 6/2018 |

OTHER PUBLICATIONS

The extended European Search Report for European Application No. 19152259.8, dated Jun. 24, 2019, 6 pages.

*Primary Examiner* — Jonathan Crepeau
(74) *Attorney, Agent, or Firm* — Law Offices of Liaoteng Wang

(57) ABSTRACT

The present disclosure relates to a separator assembly and a battery module, wherein the separator assembly comprises: a separator body, having a first surface and a second surface opposite to each other in a thickness direction of the separator body; electrical connecting plates, connected to the second surface of the separator body, wherein two or more electrical connecting plates are spaced apart from each other in a length direction of the separator body, and a through slot is provided on the separator body between two adjacent electrical connecting plates, extending from the first surface to the second surface in the thickness direction; and an output electrode plate mount, being connected to the second surface of the separator body as a cantilever.

10 Claims, 8 Drawing Sheets

SEPARATOR ASSEMBLY AND BATTERY MODULE

CROSS-REFERENCE TO RELATED APPLICATION

This application claims priority to Chinese Patent Application No. 201820969359.3, filed on Jun. 22, 2018, which is hereby incorporated by reference in its entirety.

TECHNICAL FIELD

The present disclosure relates to a technical filed of battery, and particularly to a separator assembly and battery module.

BACKGROUND

With the requirements of low-carbon and environmental protection in modern society, batteries have become more and more widely used. The remarkable feature of the batteries when applied in the fields of electric vehicles and energy storage power stations is modular assembly, that is, using a unit cell as the smallest unit, assembling two or more unit cells connected in a series or parallel manner through electrical connecting members into a battery module, and assembling two or more battery modules connected in a series or parallel manner through electrical connecting members into a battery package.

When a battery module is constituted by several unit cells, a separator assembly is also an indispensable part of the battery module. The separator assembly has a separator body and a mounting position capable of mounting the output electrode plate. However, in the separator assembly of the prior art, the mounting position for the output electrode plate is generally in the form of a mounting groove machined on the separator body. Such a mounting groove can be used for the installation of the output electrode plate. However, in the case that the battery modules with such separator assembly are connected to each other through their respective output electrode plates to constitute a battery pack, when some of the battery modules are subjected to an impact force and vibrate, since the output electrode plate is mounted in the mounting groove on the separator body, the vibration of one battery module will be transmitted to other battery modules connected thereto through the output electrode plate, causing a chain vibration of the plurality of battery modules and thus weakening the safety and stability of each battery module and the battery pack.

SUMMARY

The embodiments of the present disclosure provide a separator assembly and a battery module, wherein the separator assembly can meet the installation requirements of the output electrode plate, and meanwhile can ensure the safety and stability of the battery module applied with the separator assembly and the battery pack constituted by the battery modules.

On one aspect, a separator assembly is provided according to the embodiments of the present disclosure, and it comprises: a separator body, having a first surface and a second surface opposite to each other in a thickness direction of the separator body; electrical connecting plates, connected to the second surface of the separator body, wherein two or more electrical connecting plates are spaced apart from each other in a length direction of the separator body, and a through slot is provided on the separator body between two adjacent electrical connecting plates, extending from the first surface to the second surface in the thickness direction; and an output electrode plate mount, having a first end and a second end opposite to each other, the first end being connected to the second surface of the separator body, and the second end being positioned away from the second surface of the separator body in the thickness direction such that the output electrode plate mount is arranged as a cantilever.

According to one aspect of the embodiment of the present disclosure, the output electrode plate mount comprises a connecting plate being configured to extend in the thickness direction, and an end of the connecting plate facing the separator body is connected to the separator body.

According to one aspect of the embodiment of the present disclosure, the output electrode plate mount further comprises two side plates, and the two side plates are spaced apart from each other in the length direction of the separator body and respectively connected to the connecting plate, wherein the two side plates and the connecting plate enclose a mounting groove.

According to one aspect of the embodiment of the present disclosure, the output electrode plate mount further comprises a closing plate spaced apart from the connecting plate in a height direction of the separator body, and the closing plate is connected to the two side plates and has a dimension smaller than that of the connecting plate in the thickness direction.

According to one aspect of the embodiment of the present disclosure, the separator assembly further comprises an output electrode plate connected to the output electrode plate mount.

According to one aspect of the embodiment of the present disclosure, the separator assembly further comprises a fixing member for connecting the output electrode plate mount with the output electrode plate and being disposed on the mounting groove, wherein the output electrode plate comprises a first connecting plate and a second connecting plate connected to each other, the first connecting plate being disposed in the mounting groove and having a mounting opening through which the fixing member is configured to pass, and the second connecting plate being connected to the separator body and being connectable to an electrode lead of a unit cell.

According to one aspect of the embodiment of the present disclosure, the mounting groove is provided with a strip-shaped protrusion for engaging with the fixing member, and the strip-shaped protrusion is spaced apart from the connecting plate in a height direction of the separator body and extends in the thickness direction, wherein the strip-shaped protrusion has a dimension smaller than that of the connecting plate in the length direction; and/or the mounting groove is provided with an engaging plate for engaging with the fixing member, and the engaging plate is spaced apart from the connecting plate in the height direction of the separator body and extends in the length direction, wherein the engaging plate has dimensions smaller than that of the connecting plate in the thickness direction and the length direction.

According to one aspect of the embodiment of the present disclosure, the first connecting plate has a thickness greater than that of the second connecting plate.

According to one aspect of the embodiment of the present disclosure, the first connecting plate is formed by laminating two or more layers of sheets; and the second connecting plate includes a first segment being parallel to and connected to the first connecting plate, a second segment being connectable to the electrode lead, and an intermediate segment for connecting the first segment with the second segment and being connected to the separator body, wherein the first segment is configured to intersect with the intermediate segment and to define an engaging groove for engaging with the connecting plate together with the first connecting plate.

On a further aspect, a battery module is provided according to the embodiments of the present disclosure, wherein the battery module comprises: a plurality of unit cells, being stacked with each other and electrically connected to each other, and each including an electrode lead; the separator assembly as described above, being arranged with the first surface of the separator body facing the unit cells; and an output electrode plate, being connected to the output electrode plate mount and electrically connected to the electrode lead of the unit cell of the plurality of unit cells as an output of the battery module.

On a further aspect, a battery module is provided according to the embodiments of the present disclosure, wherein the battery module comprises: a plurality of unit cells, being stacked with each other and electrically connected to each other, and each including an electrode lead; and the separator assembly as described above, being arranged with the first surface of the separator body facing the unit cells, wherein the output electrode plate is connected to the output electrode plate mount and electrically connected to the electrode lead of the unit cell of the plurality of unit cells as an output of the battery module.

The separator assembly according to the embodiments of the present disclosure includes the separator body, the electrical connecting plates and the output electrode plate mount. When applied to the battery module, the separator body is arranged with the first surface facing a plurality of unit cells, wherein electrode leads of the plurality of unit cells penetrate through the through slots between the corresponding two electrical connecting plates and are electrically connected to each other through the electrical connecting plates. The output electrode plate mount is arranged with the first end connected to the second surface of the separator body, and with the second end positioned away from the second surface, such that the output electrode plate mount is arranged as a cantilever. The output electrode plate of the battery module can be connected to the output electrode plate mount and fixedly connected with the electrode lead of the corresponding unit cell. In the case that a plurality of battery modules with such separator assembly constitute a battery pack and some of the battery modules are subjected to an impact force, although the vibration can be transmitted to other battery modules connected thereto through the connection of the output electrode plates, most of the vibration can be absorbed by the output electrode plate mount, since the output electrode plate mount is arranged as a cantilever and the second end thereof can swing by a certain amplitude in the direction of the force. Thus, the transmission of the vibration between the battery modules can be reduced or avoided, thereby ensuring the safety and stability of the battery modules and the battery pack constituted by the battery modules.

BRIEF DESCRIPTION OF THE DRAWINGS

Features, advantages, and technical effects of exemplary embodiments of the present disclosure will be described below with reference to the drawings.

Figure 1:
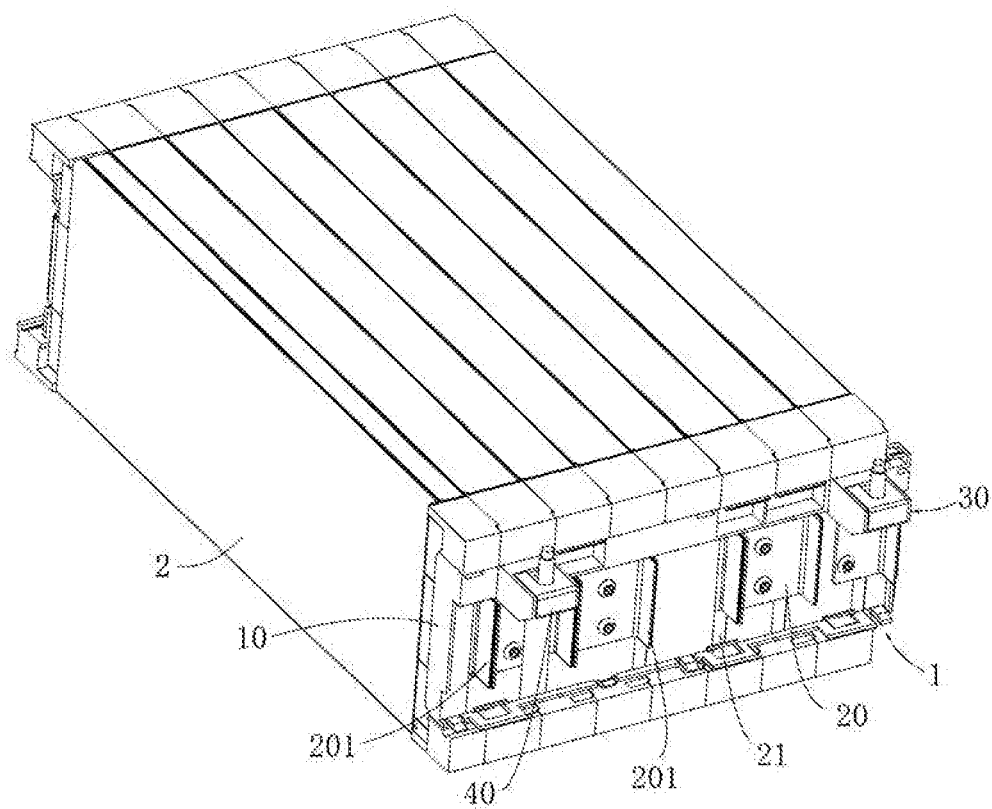
FIG. 1 shows a perspective view of a battery module according to an embodiment of the present disclosure.

X—thickness direction; Y—length direction; Z—height direction;

1—separator assembly;

10—separator body; 11—first surface; 12—second surface;

20—electrical connecting plate; 21—through slot;

30—output electrode plate mount; 30*a*—first end; 30*b*—second end;

31—side plate; 32—connecting plate; 33—mounting groove; 34—closing plate; 35—strip-shaped protrusion; 36—engaging plate;

40—output electrode plate;

41—first connecting plate; 411—mounting opening;

42—second connecting plate; 421—first segment; 422—intermediate segment; 423—second segment; 424—engaging groove;

50—fixing member;

60—gap;

2—unit cell; 201—electrode lead.

In the drawings, the same components are denoted by the same reference numbers. The drawings are not drawn to scale.

DETAILED DESCRIPTION

Features and exemplary embodiments of various aspects of the present disclosure are described in detail below. In the following detailed description, numerous specific details are set forth to provide a comprehensive understanding of the present disclosure. However, it will be apparent to those skilled in the art that the present disclosure may be practiced without some of these details. The following description of embodiments is merely provided to provide a better understanding of the present disclosure by examples of the present disclosure. In the drawings and the following description, at least some of common structures and techniques are not shown in order to avoid unnecessary obscuring of the present disclosure. Furthermore, for clarity, dimensions of some of structures may be exaggerated. Furthermore, features, structures, or characteristics described hereinafter may be combined in any suitable manner in one or more embodiments.

The orientation words appearing in the following description are directions shown in the drawings and are not intended to limit a specific structure of the separator assembly and the battery pack of the present disclosure. In the description of the present disclosure, it should be noted that the terms "installation" and "connection" are to be understood broadly, and may be, for example, a fixed connection or a detachable connection or an integral connection, a direct connection or an indirect connection, unless otherwise explicitly stated and defined. For those skilled in the art, the specific meanings of the above terms in the present disclosure can be understood according to specific cases.

For a better understanding of the present disclosure, a separator assembly and a battery module according to embodiments of the present disclosure will be described in detail below with reference to FIG. 1 to FIG. 12.

Referring to FIG. 1, and FIG. 1 shows a perspective view of a battery module according to an embodiment of the present disclosure. A battery module is provided according to an embodiment of the present disclosure, comprising a plurality of unit cells 2 and a separator assembly 1 according to an embodiment of the present disclosure. The plurality of unit cells 2 are stacked with each other and electrically connected to each other, and each unit cell 2 comprises an electrode lead 201.

Figure 2:
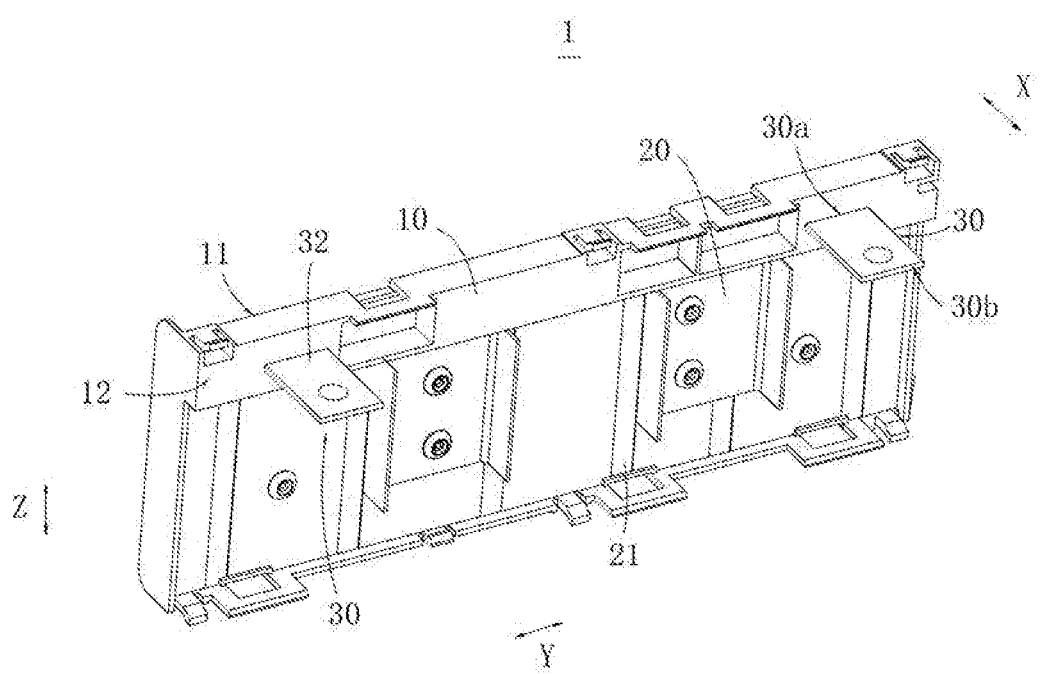
FIG. 2 shows a schematic view of a structure of a separator assembly according to one embodiment of the present disclosure.

FIG. 2 shows a schematic view of a structure of a separator assembly according to one embodiment of the present disclosure. Referring also to FIG. 2, the separator assembly 1 comprises a separator body 10, electrical connecting plates 20, and an output electrode plate mount 30. The separator body 10 has a first surface 11 and a second surface 12 opposite to each other in its thickness direction X, and is arranged with the first surface 11 facing the plurality of unit cells 2. The electrical connecting plates 20 are connected to the second surface 12 of the separator body 10, and two or more electrical connecting plates 20 are spaced apart from each other in a length direction Y of the separator body 10. A through slot 21 is provided on the separator body 10 between two adjacent electrical connecting plates 20, extending from the first surface 11 to the second surface 12 in the thickness direction X of the separator body 10. The output electrode plate mount 30 has a first end 30a and a second end 30b opposite to each other. The first end 30a is connected to the second surface 12, and the second end 30b is positioned away from the second surface 12 in the thickness direction X such that the output electrode plate mount 30 is arranged as a cantilever.

The separator body 10 may be particularly structured into a shape of rectangular plate, and has a predetermined length, height, and thickness. The specific values of the length, height, and thickness of the separator body 10 may be set according to a type of the battery module to be applied.

Optionally, each electrical connecting plate 20 may be formed into a rectangular sheet and may be connected to the separator body 10 by inlaying, bonding or other means. The specific number of the electrical connecting plates 20 can be determined according to the number of the unit cells 2 to be connected in series or in parallel. The through slot 21 between the two adjacent electrical connecting plates 20 of the two or more electrical connecting plates 20 is used for penetration and electrical connection of the electrode lead 201 of the unit cell 2 to the corresponding electrical connecting plate 20, such that the plurality of unit cells 2 can be connected in series or in parallel by the electrical connecting plates 20.

There may be two output electrode plate mounts 30, and the two output electrode plate mounts 30 can be symmetrically disposed in the length direction Y of the separator body 10, and preferably located at one end of the separator body 10 in a height direction Z. Both the output electrode plate mount 30 and the separator body 10 are made of insulating materials, and they can be connected by bonding, integral molding or other means.

The output electrode plate mount 30 can be formed as shown in FIG. 2 and comprises a connecting plate 32 extending in the thickness direction X of the separator body 10, and one end of the connecting plate 32 facing the separator body 10 is connected to the separator body 10.

In order to meet charging requirements of the battery module, the separator assembly 1 is further provided with an output electrode plate 40. The output electrode plate 40 can be a common output electrode plate, and can be connected to the output electrode plate mount 30 by welding or fasteners, and meanwhile connected and fixed to the electrode lead 201 of the corresponding unit cell 2.

When the separator assembly 1 provided by the embodiments of the present disclosure is applied to the battery module, the first end 30a of the output electrode plate mount 30 is connected to the second surface 12 of the separator body 10, and the second end 30b is positioned away from the second surface 12 such that the output electrode plate mount 30 is arranged as a cantilever. When multiple battery modules with such separator assembly 1 constitute a battery pack together and some of the battery modules are subjected to an impact force, although the vibration can be transmitted to other battery modules connected to them through the connection of the output electrode plates 40, since the output electrode plate mount 30 is arranged as a cantilever, the second end 30b can swing with a certain amplitude in a direction of the force and thus most of the vibration can be absorbed. Therefore, the transmission of the vibration among the battery modules can be reduced or avoid, ensuring safety and stability of the battery modules and thus the battery pack constituted by the battery modules.

Figure 3:
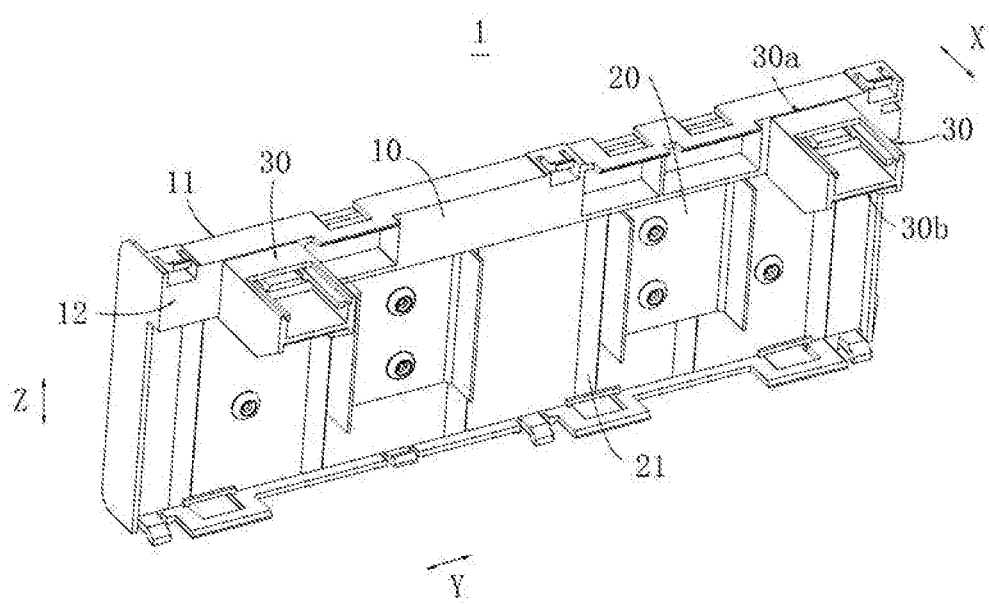
FIG. 3 shows a schematic view of a structure of a separator assembly according to a further embodiment of the present disclosure.
Figure 4:
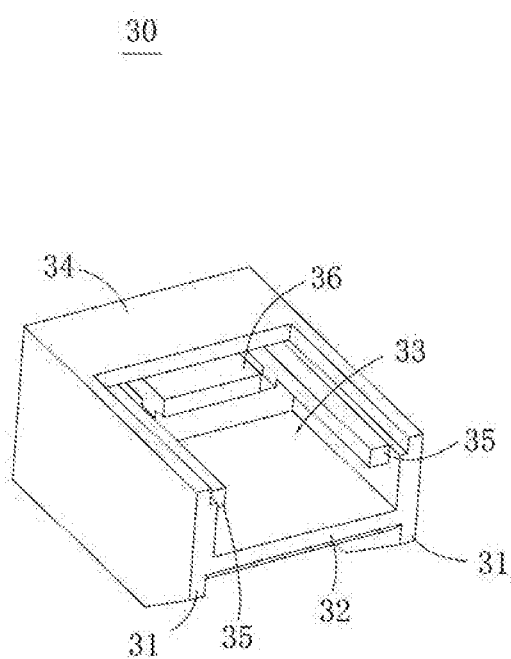
FIG. 4 shows a perspective view of the output electrode plate mount of FIG. 3.

FIG. 3 shows a schematic view of a structure of a separator assembly according to a further embodiment of the present disclosure, and FIG. 4 shows a perspective view of the output electrode plate mount of FIG. 3. Referring to both FIG. 3 and FIG. 4, as an alternative embodiment, each output electrode plate mount 30 is preferably formed approximately in a shape of cube, and further comprises two side plates 31 spaced apart from each other in the length direction Y of the separator body 10 and connected to the connecting plate 32, wherein the two side plates 31 and the connecting plate 32 enclose a mounting groove 33. The two side plates 31 are preferably parallel to each other in the length direction Y of the separator body 10, while perpendicular to the connecting plate 32, so that the defined mounting groove 33 is formed into a rectangular groove. Preferably, the connecting plate 32 is connected to the two side plates 31 in or near the middle thereof in the height direction Z of the separator body 10. When applied to the battery module, the output electrode plate can be partially mounted to the mounting groove 33 of the output electrode plate mount 30 and partially connected to the electrode lead 201 of the unit cell 2 of the battery module.

Referring to FIG. 4, in order to improve the connection strength between the two side plates 31, as an optional embodiment, the output electrode plate mount 30 further comprises a closing plate 34 spaced apart from the connecting plate 32 in the height direction Z of the separator body 10 and connected to the two side plates 31. The closing plate 34 has a dimension smaller than that of the connecting plate 32 in the thickness direction X of the separator body 10.

Thus, the installation of the output electrode plate will not be affected while the connection strength of the two side plates 31 can be ensured. In a specific implementation, the closing plate 34 is preferably further connected to the separator body 10, and thus the connection strength between the entire output electrode plate mount 30 and the separator body 10 can be improved.

The separator assembly 1 according to the above embodiments comprises the separator body 10, the electrical connecting plates 20 and the output electrode plate mount 30. After being formed and then applied to the battery module, the separator assembly 1 can be further mounted with the output electrode plate 40. This is an alternative embodiment, but the separator assembly 1 are not limited thereto.

Figure 5:
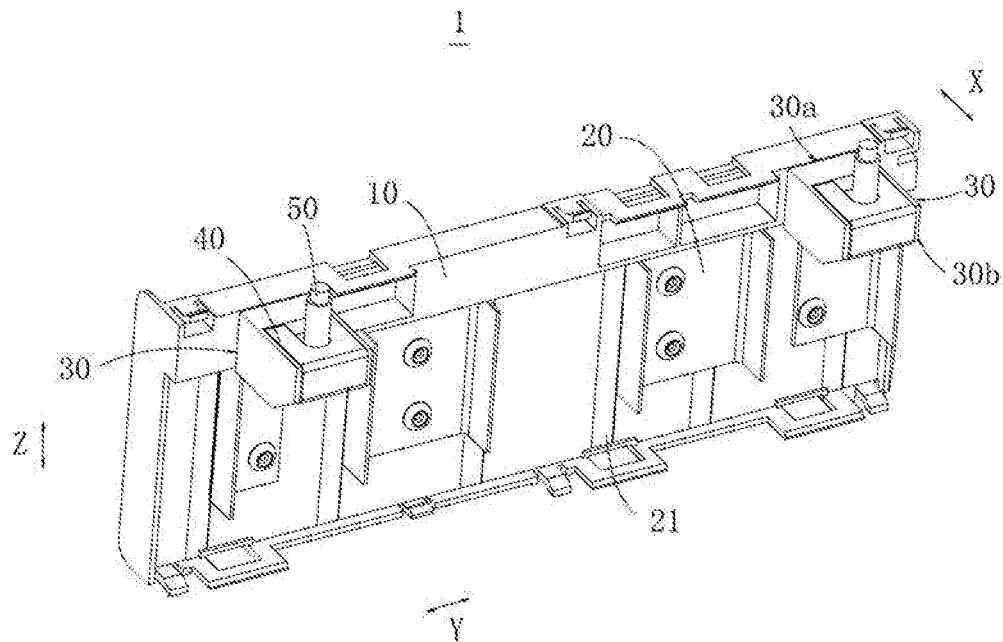
FIG. 5 shows a perspective view of a separator assembly according to a further embodiment of the present disclosure.
Figure 6:
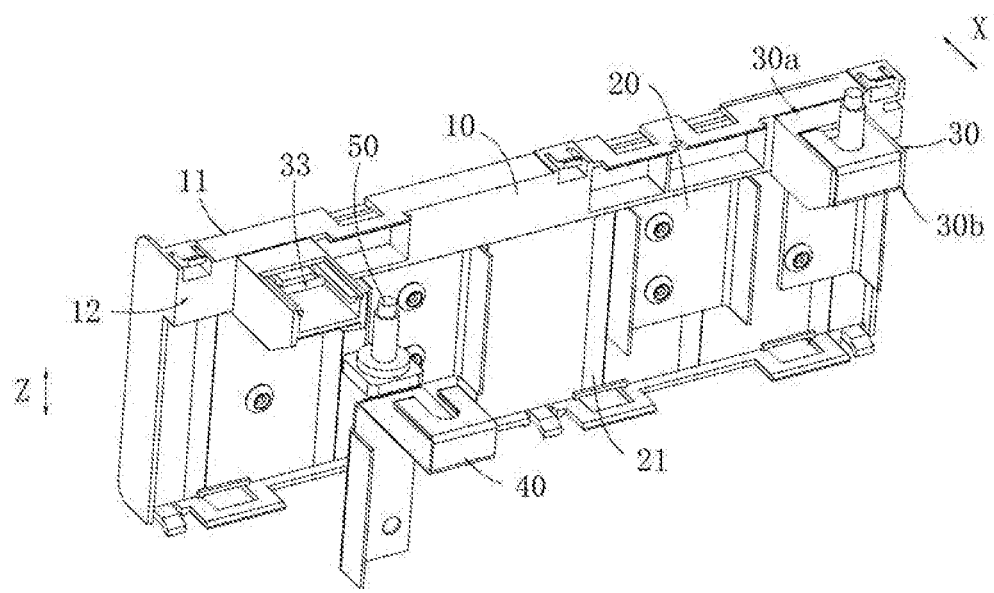
FIG. 6 shows an exploded view of the structure shown in FIG. 5.

FIG. 5 shows a perspective view of a separator assembly according to a further embodiment of the present disclosure, and FIG. 6 shows an exploded view of the structure shown in FIG. 5. Referring to both FIG. 5 and FIG. 6, in order to improve the assembly efficiency of the battery module applied with the separator assembly 1 according to the embodiments of the present disclosure, the output electrode plate 40 may be configured as a part of the separator assembly 1, that is, the separator assembly 1 further comprises an output electrode plate 40 that is connected to the output electrode plate mount 30.

Meanwhile, in order to better ensure the connection strength between the output electrode plate 40 and the output electrode plate mount 30, the separator assembly 1 further comprises a fixing member 50, which is disposed in the mounting groove 33 of the output electrode plate mount and used for connecting the output electrode plate mount 30 with the output electrode plate 40. In a specific implementation, the fixing member 50 may employ different types of fixing structures, such as bolts, screws, and rivets, preferably screws. The fixing member 50 is arranged with its end head facing the connecting plate 32 of the output electrode plate mount 30. The fixing member 50 and the output electrode plate mount 30 can be connected by different fixing connection manners, such as bonding, engaging, or the like.

Therefore, the connection of the output electrode 40 to an external device can be achieved by a simple structure. Since the connection structure is simple, the assembly efficiency is high, and the stability of the electrical connection of the output electrode plate 40 to the external device can be ensured.

Figure 7:
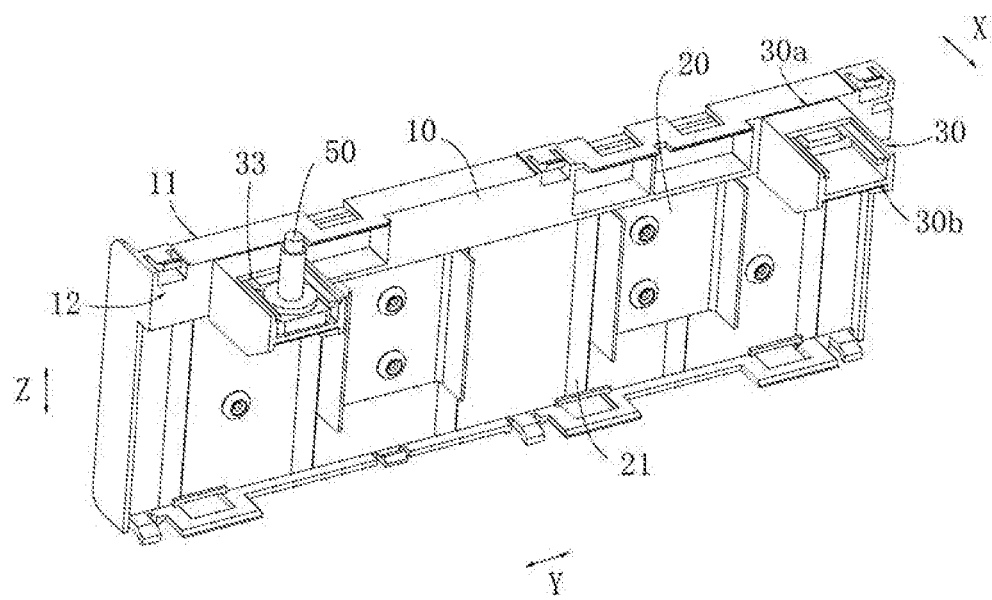
FIG. 7 shows a perspective view of a partial structure of a separator assembly according to a further embodiment of the present disclosure.
Figure 8:
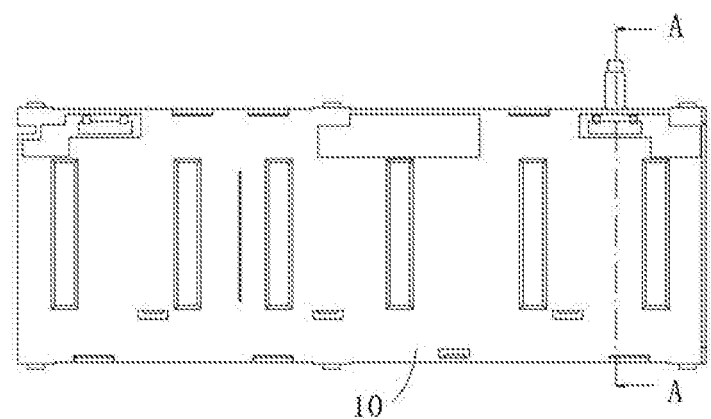
FIG. 8 shows a rear view of the structure shown in FIG. 7.
Figure 9:
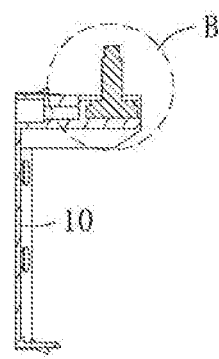
FIG. 9 shows a cross-sectional view taken along the line A-A as shown in FIG. 8.
Figure 10:
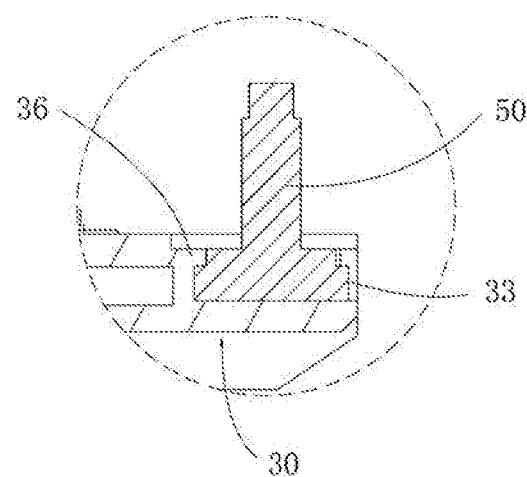
FIG. 10 shows an enlarged view of the portion B in FIG. 9.
Figure 11:
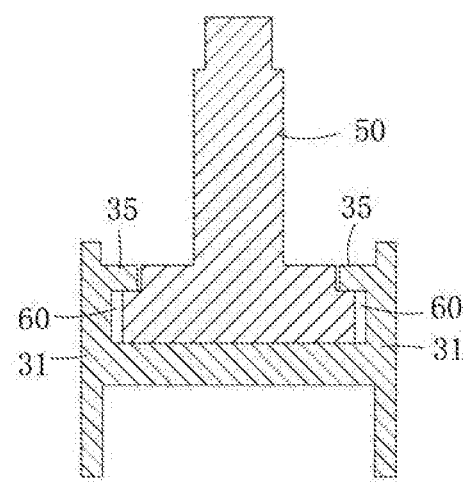
FIG. 11 shows a cross-sectional view of the fixing member engaged with an output electrode plate mount.

Referring to FIG. 7 to FIG. 11, FIG. 7 shows a perspective view of a partial structure of a separator assembly according to a further embodiment of the present disclosure, FIG. 8 shows a rear view of the structure shown in FIG. 7, FIG. 9 shows a cross-sectional view taken along the line A-A as shown in FIG. 8, FIG. 10 shows an enlarged view of the portion B in FIG. 9, and FIG. 11 shows a cross-sectional view of the fixing member 50 engaged with the output electrode plate mount 30.

As shown in FIG. 4 and FIG. 7 to FIG. 11, a detachable connection between the fixing member 50 and the output electrode plate mount 30 is preferable. In this case, to ensure the connection strength between the fixing member 50 and the output electrode plate mount 30 and avoid irregular sway of the fixing member 50 on the output electrode plate mount 30, as an optional embodiment, the mounting groove 33 is further provided with a strip-shaped protrusion 35 spaced apart from the connecting plate 32 in the height direction Z of the separator body 10 and extending in the thickness direction X of the separator body 10. The strip-shaped protrusion 35 has a dimension smaller than that of the connecting plate 32 in the length direction Y of the separator body 10. The strip-shaped projection 35 can engage with the fixing member 50, to fix the fixing member 50. Optionally, each side plate 31 is provided with one strip-shaped protrusion 35, and the strip-shaped protrusions 35 on the two side plates 31 are arranged at the same height and symmetrical to each other.

With the above configuration, when the fixing member 50 is mounted to the output electrode plate mount 30, the end head of the fixing member 50 can be inserted into the mounting groove 33 from the second end 30b of the output electrode plate mount 30, and travels toward the first end 30a of the output electrode plate mount 30 along the thickness direction X of the separator body 10 until the end head of the fixing member 50 completely enters the mounting groove 33. A portion of the fixing member 50 protrudes upwards in the height direction Z of the separator body 10 and is used for connecting with the output electrode plate 40. The strip-shaped protrusions 35 can engage with the end head of the fixing member 50 to limit and fix the fixing member 50.

Optionally, the end head of the fixing member 50 has a dimension smaller than that of the mounting groove 33 in the length direction Y of the separator body 10, so that the end head of the fixing member 50 and the two side plates 31 of the output electrode plate mount 30 are engaged with each other in a clearance fit. That is, there is a gap 60 between the end head of the fixing member 50 and each side plate 31, which facilitates the disassembly and assembly of the fixing member 50, and meanwhile, the strip-shaped projections 35 can engage with the fixing member 50 and limit the fixing member 50 in the height direction Z of the separator body 10, thereby ensuring the connection strength between the fixing member 50 and the output electrode plate mount 30.

In order to further ensure the stability of the connection between the fixing member 50 and the output electrode plate mount 30, optionally, an engaging plate 36 is provided within the mounting groove 33. The engaging plate 36 is configured to be spaced apart from the connecting plate 32 in the height direction Z of the separator body 10 and extend in the length direction Y of the separator body 10. The engaging plate 36 has dimensions smaller than that of the connecting plate 32 in the thickness direction X and the length direction Y of the separator body 10. The engaging plate 36 can engage with the fixing member 50, further fixing the fixing member 50 and ensuring the stability of the fixing member 50.

It can be understood that it is preferable that both of the strip-shaped protrusions 35 and the engaging plate 36 are provided in the mounting groove 33, so that the limiting and fixing effect on the fixing member 50 is better. But the present disclosure is not limited thereto, the strip-shaped projection 35 or the engaging plate 36 may be separately provided in the mounting groove 33 of the output electrode plate mount 30, as long as requirements on the limiting and fixing of the fixing member 50 can be satisfied.

Figure 12:
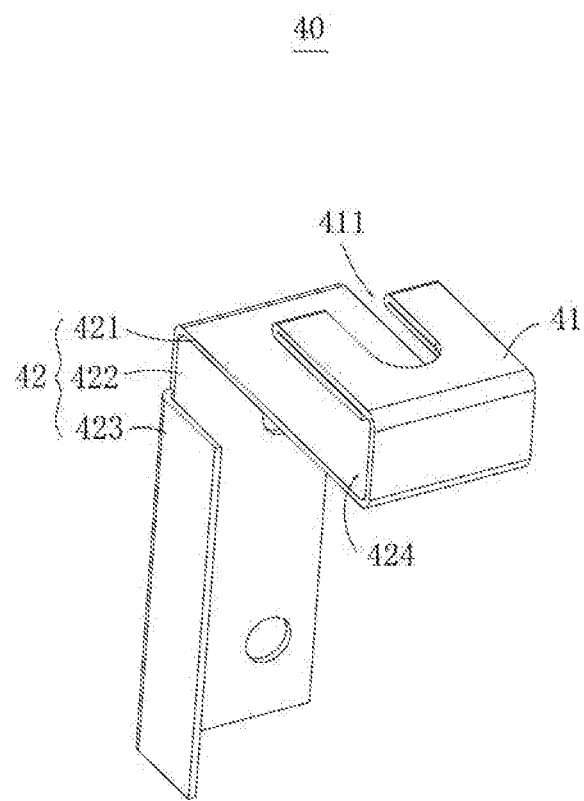
FIG. 12 shows a perspective view of an output electrode plate according to an embodiment of the present disclosure.

Referring also to FIG. 12. FIG. 12 shows a perspective view of the output electrode plate 40 according to an embodiment of the present disclosure. The output electrode plate 40 according to the embodiment of the present disclosure preferably includes a first connecting plate 41 and a second connecting plate 42 connected to each other. The first connecting plate 41 can be disposed in the mounting groove 33 of the output electrode plate mount 30 and is provided with a mounting opening 411 through which the fixing member 50 can pass. The second connecting plate 42 is connected to the separator body 10 and is connectable to the electrode lead 201 of the unit cell 2. The mounting opening 411 may be formed as a through hole penetrating through the first connecting plate 41 in a thickness direction of the first connecting plate 41. Of course, the mounting opening 411 may be formed as a slot with one end facing the separator body 10 opened, as long as it is convenient to install the fixing member 50.

The output electrode plate 40 with the above-described structure can be applied to the separator assembly 1 with the output electrode plate mount 30 arranged as a cantilever as shown in FIG. 2 and FIG. 3, and when applied to the output electrode plate mount 30 as shown in FIG. 3, the separator assembly 1 as shown in FIG. 5 can be formed, where it is convenient for the output electrode plate 40 to connect with the separator body 10 and the output electrode plate mount 30. When applied to the battery module, it is convenient for the output electrode plate 40 to connect and fix with the electrode lead 201 of the corresponding unit cell 2, and the output electrode plate 40 also can absorb the vibration by cooperating with the output electrode plate mount 30 and further protect its connecting position with the electrode lead 201 of the corresponding unit cell 2 from being disturbed and damaged by the vibration.

Since the first connecting plate 41 is provided with the mounting opening 411, the first connecting plate 41 has a weaker overcurrent capability with respect to other positions of the output electrode plate 40. Therefore, as an alternative embodiment, the first connecting plate 41 has a thickness greater than that of the second connecting plate 42. By such a configuration, the overcurrent capability of the first connecting plate 41 can be increased, so as to match with that of the second connecting plate 42, ensuring the service life and safety of the output electrode plate 40 and thus the battery module.

Moreover, since the problem of matching the overcurrent capability is solved by increasing the thickness of the first connecting plate 41, it is still easy for the output electrode plate 40 to be installed, and it is not necessary to change the structures of the structural members connected with the output electrode plate 40, such as the output electrode plate mount 30 and the separator body 10, thus problems such as space mismatch, space waste or cost increase will not be caused.

Alternatively, the first connecting plate 41 may be formed by one layer of sheet. Of course, preferably, it may be formed by laminating two or more layers of sheets. The two or more layers of sheets may have different thickness. Of course, it is preferable that the two or more layers of sheets have the same thickness. The two or more layers of sheets may be of separate structures, and also may be formed by bending and stacking one single sheet, as long as the overcurrent capability of the first connecting plate 41 can match with that of the second connecting plate 42.

Referring to FIG. 5, FIG. 6 and FIG. 12, as an alternative embodiment, the second connecting plate 42 includes a first segment 421 parallel to and connected to the first connecting plate 41, a second segment 423 being connectable to the electrode lead 201, and an intermediate segment 422 for connecting the first segment 421 with the second segment 423, wherein the intermediate segment 422 can be connected with the separator body 10 by fasteners such as screws, rivets, or the like, and an engaging groove 424 is formed by the first segment 421 and the first connecting plate 41 for engaging with the connecting plate 32. The engaging groove 424 formed in the output electrode plate 40 can better ensure the stability of connection between the output electrode plate 40 and the output electrode plate mount 30, and meanwhile can facilitate the connection of the intermediate segment 422 with the separator body 10. In the case that the engaging groove 424 engages with the connecting plate 32 of the output electrode plate mount 30, the two side plates 31 are located on both sides of the output electrode plate 40, preventing the movement of the second connecting plate 42 and meanwhile protecting the second connecting plate 42.

Since the output electrode plate mount 30 is arranged as a cantilever, in order to better adapt to the connection to the output electrode plate mount 30 and the separator body 10, it is preferred that the intermediate segment 422 and the first segment 421 intersect with each other, with a preferable intersection angle of 90°, and that the second segment 423 is connected to the intermediate segment 422. Since the output electrode plate 40 is configured such that the first segment 421 intersects with the intermediate segment 422 and is connected to the output electrode plate mount 30 through the first segment 421 and the first connecting plate 41, when the separator body 10 is subjected to the vibration, the vibration transmitted to the output electrode plate mount 30 also can be absorbed partially by the deformation between the first segment 421 and the intermediate segment 422, besides absorbed most by the output electrode plate mount 30. This can further reduce or avoid the vibration that are transmitted to the connection position of the second segment 423 of the output electrode plate 40 with the corresponding electrode lead 201, ensuring the connection reliability of the output electrode plate 40 with the electrode lead 201, avoiding the dragging and damage to the electrode lead 201, and thus better ensuring the safety of the battery module.

Optionally, the first connecting plate 41 and the second connecting plate 42 may be formed by connecting different sheets to each other. Of course, in order to ensure the electrical conductivity and the convenience of production, the first connecting plate 41 and the second plate 42 are preferably formed as an integral structure, that is, formed by bending the same sheet.

It can be understood that the output electrode plate 40 provided by the embodiments of the present disclosure is provided for the separator assembly 1 as shown in FIG. 2 and FIG. 3 in which the output electrode plate amount 30 is arranged as a cantilever, and mainly used for the separator assembly 1 with the output electrode plate amount 30 arranged as a cantilever. However, the application of the output electrode plate 40 is not limited to this, and can be applied to the separator assembly of other embodiments, so as to meet the charging and discharging requirements of the battery module, which will not be described herein.

Therefore, the battery module provided by the embodiments of the present disclosure includes the separator assembly 1 comprising the separator body 10 and the output electrode plate mount 30 connected to the separator body 10 and arranged as a cantilever. Such a battery module not only can meet the charging and discharging requirement of itself, but also can resist the vibration itself generated due to an impact force, reduce or avoid the transmission of the vibration to other battery modules connected to it, which will cause a chain vibration, thereby ensuring the safety of the battery module itself and thus safety of the battery pack constituted by the battery modules.

Meanwhile, the separator assembly 1 further includes the fixing member 50, and the fixing member 50 is inserted into the mounting groove 33 of the output electrode plate mount 30. Since the connection and fixing of the output electrode plate 40 is realized by such a fixing member 50, the increase in the size of an enclosure of the battery module can be reduced, thereby reducing the manufacturing cost of the enclosure of the battery module. In addition, the connection structure is simple, and thus the assembly efficiency can be improved. Further, the surface of the fixing member 50 is free from the influence of insulating materials, and thus the stability of the electrical connection of the battery module with external devices can be ensured.

Although the present disclosure has been described with reference to the preferred embodiments, various modifications may be made to the present disclosure and components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. A separator assembly, comprising:
   a separator body, having a first surface and a second surface opposite to each other in a thickness direction of the separator body;
   electrical connecting plates, connected to the second surface of the separator body, wherein two or more electrical connecting plates are spaced apart from each other in a length direction of the separator body, and a through slot is provided on the separator body between two adjacent electrical connecting plates, extending from the first surface to the second surface in the thickness direction; and
   an output electrode plate mount, having a first end and a second end opposite to each other, the first end being connected to the second surface of the separator body, and the second end being positioned away from the second surface of the separator body in the thickness direction such that the output electrode plate mount is arranged as a cantilever,
   wherein the output electrode plate mount comprises a connecting plate being configured to extend in the thickness direction, and an end of the connecting plate facing the separator body is connected to the separator body,
   the output electrode plate mount further comprises two side plates, and the two side plates are spaced apart from each other in the length direction of the separator body and respectively connected to the connecting plate, wherein the two side plates and the connecting plate enclose a mounting groove,
   the separator assembly further comprises an output electrode plate connected to the output electrode plate mount, and a fixing member for connecting the output electrode plate mount with the output electrode plate and being disposed on the mounting groove, wherein the output electrode plate comprises a first connecting plate and a second connecting plate connected to each other, the first connecting plate being disposed in the mounting groove and having a mounting opening through which the fixing member is configured to pass, and the second connecting plate being connected to the separator body and being connectable to an electrode lead of a unit cell.

2. The separator assembly of claim 1, wherein the output electrode plate mount further comprises a closing plate spaced apart from the connecting plate in a height direction of the separator body, and the closing plate is connected to the two side plates and has a dimension smaller than that of the connecting plate in the thickness direction.

3. The separator assembly of claim 1, wherein the mounting groove is provided with at least one of a strip-shaped protrusion for engaging with the fixing member and an engaging plate for engaging with the fixing member,
   wherein the strip-shaped protrusion is spaced apart from the connecting plate in a height direction of the separator body and extends in the thickness direction, and the strip-shaped protrusion has a dimension smaller than that of the connecting plate in the length direction, and
   the engaging plate is spaced apart from the connecting plate in the height direction of the separator body and extends in the length direction, and the engaging plate has dimensions smaller than that of the connecting plate in the thickness direction and the length direction.

4. The separator assembly of claim 1, wherein the first connecting plate has a thickness greater than that of the second connecting plate.

5. The separator assembly of claim 4, wherein
   the first connecting plate is formed by laminating two or more layers of sheets; and
   the second connecting plate includes a first segment being parallel to and connected to the first connecting plate, a second segment being connectable to the electrode lead, and an intermediate segment for connecting the first segment with the second segment and being connected to the separator body, wherein the first segment is configured to intersect with the intermediate segment and to define an engaging groove for engaging with the connecting plate together with the first connecting plate.

6. A battery module, comprising:
   a plurality of unit cells, being stacked with each other and electrically connected to each other, and each including an electrode lead; and
   a separator assembly, comprising:
      a separator body, having a first surface and a second surface opposite to each other in a thickness direction of the separator body;
      electrical connecting plates, connected to the second surface of the separator body, wherein two or more electrical connecting plates are spaced apart from each other in a length direction of the separator body, and a through slot is provided on the separator body between two adjacent electrical connecting plates, extending from the first surface to the second surface in the thickness direction; and
      an output electrode plate mount, having a first end and a second end opposite to each other, the first end being connected to the second surface of the separator body, and the second end being positioned away from the second surface of the separator body in the thickness direction such that the output electrode plate mount is arranged as a cantilever,
      wherein the output electrode plate mount comprises a connecting plate being configured to extend in the thickness direction, and an end of the connecting plate facing the separator body is connected to the separator body,
      the output electrode plate mount further comprises two side plates, and the two side plates are spaced apart from each other in the length direction of the separator body and respectively connected to the connecting plate, wherein the two side plates and the connecting plate enclose a mounting groove, and wherein the separator assembly further comprises an output electrode plate connected to the output electrode plate mount, wherein the separator assembly is arranged with the first surface of the separator body facing the unit cells, and the output electrode plate is connected to the output electrode plate mount and electrically connected to the electrode lead of the unit cell of the plurality of unit cells as an output of the battery module, and wherein the separator assembly further comprises a fixing member for connecting the output electrode plate mount with the output electrode plate and being disposed on the mounting groove, wherein the output electrode plate comprises a first connecting plate and a second connecting plate connected to each other, the first connecting plate being disposed in the mounting groove and having a mounting opening through which the fixing member is configured to pass, and the second connecting plate being connected to the separator body and being connectable to the electrode lead of the unit cell.

7. The battery module of claim 6, wherein the output electrode plate mount further comprises a closing plate spaced apart from the connecting plate in a height direction of the separator body, and the closing plate is connected to the two side plates and has a dimension smaller than that of the connecting plate in the thickness direction.

8. The battery module of claim 6, wherein the mounting groove is provided with at least one of a strip-shaped protrusion for engaging with the fixing member and an engaging plate for engaging with the fixing member, wherein the strip-shaped protrusion is spaced apart from the connecting plate in a height direction of the separator body and extends in the thickness direction, and the strip-shaped protrusion has a dimension smaller than that of the connecting plate in the length direction, and the engaging plate is spaced apart from the connecting plate in the height direction of the separator body and extends in the length direction, and the engaging plate has dimensions smaller than that of the connecting plate in the thickness direction and the length direction.

9. The battery module of claim 6, wherein the first connecting plate has a thickness greater than that of the second connecting plate.

10. The battery module of claim 9, wherein the first connecting plate is formed by laminating two or more layers of sheets; and the second connecting plate includes a first segment being parallel to and connected to the first connecting plate, a second segment being connectable to the electrode lead, and an intermediate segment for connecting the first segment with the second segment and being connected to the separator body, wherein the first segment is configured to intersect with the intermediate segment and to define an engaging groove for engaging with the connecting plate together with the first connecting plate.

* * * * *